Figure 1:
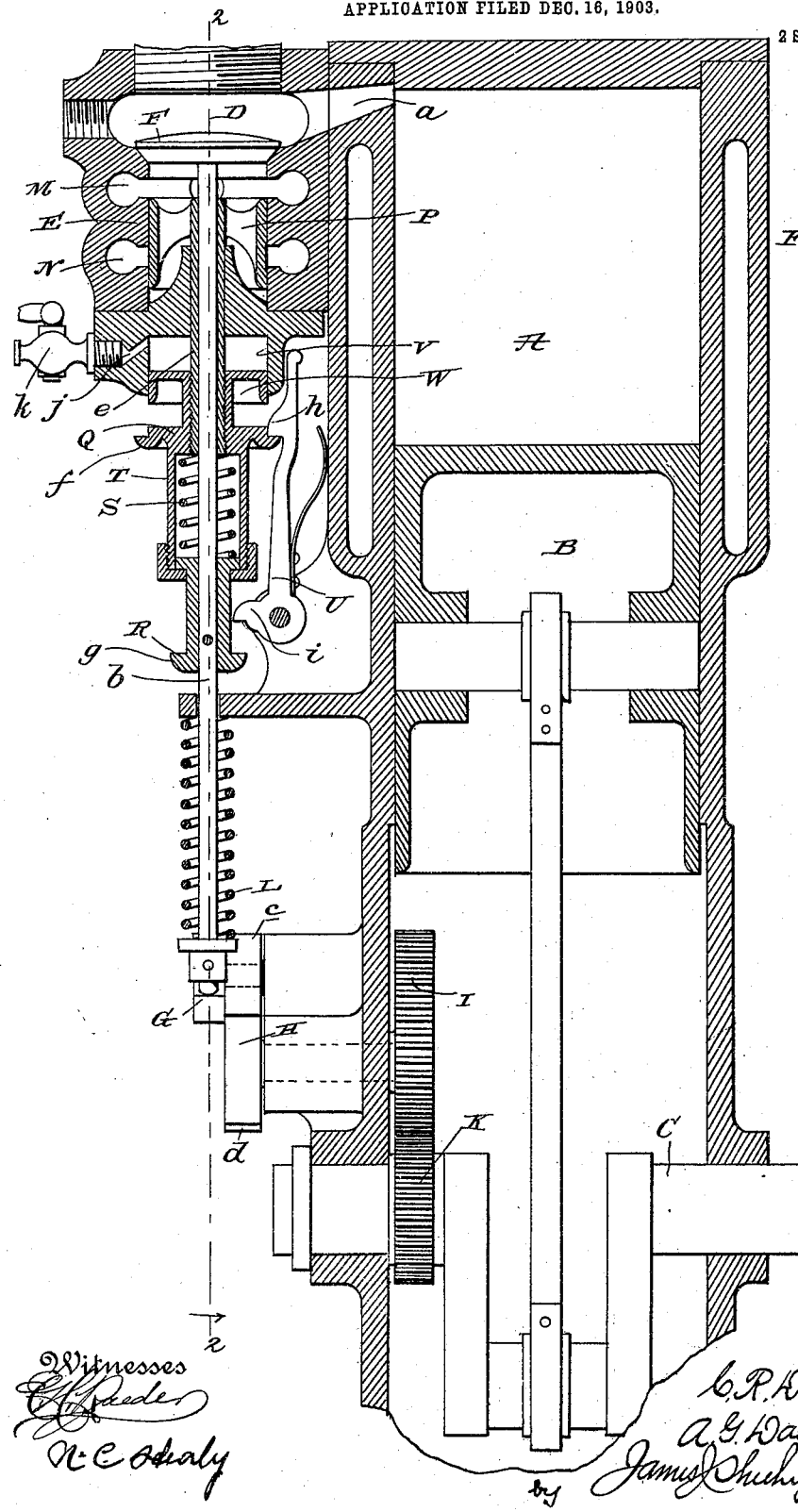

No. 783,105. PATENTED FEB. 21, 1905.
C. R. & A. G. DAELLENBACH.
VALVE GEAR FOR EXPLOSIVE ENGINES.
APPLICATION FILED DEC. 16, 1903.
2 SHEETS—SHEET 2.
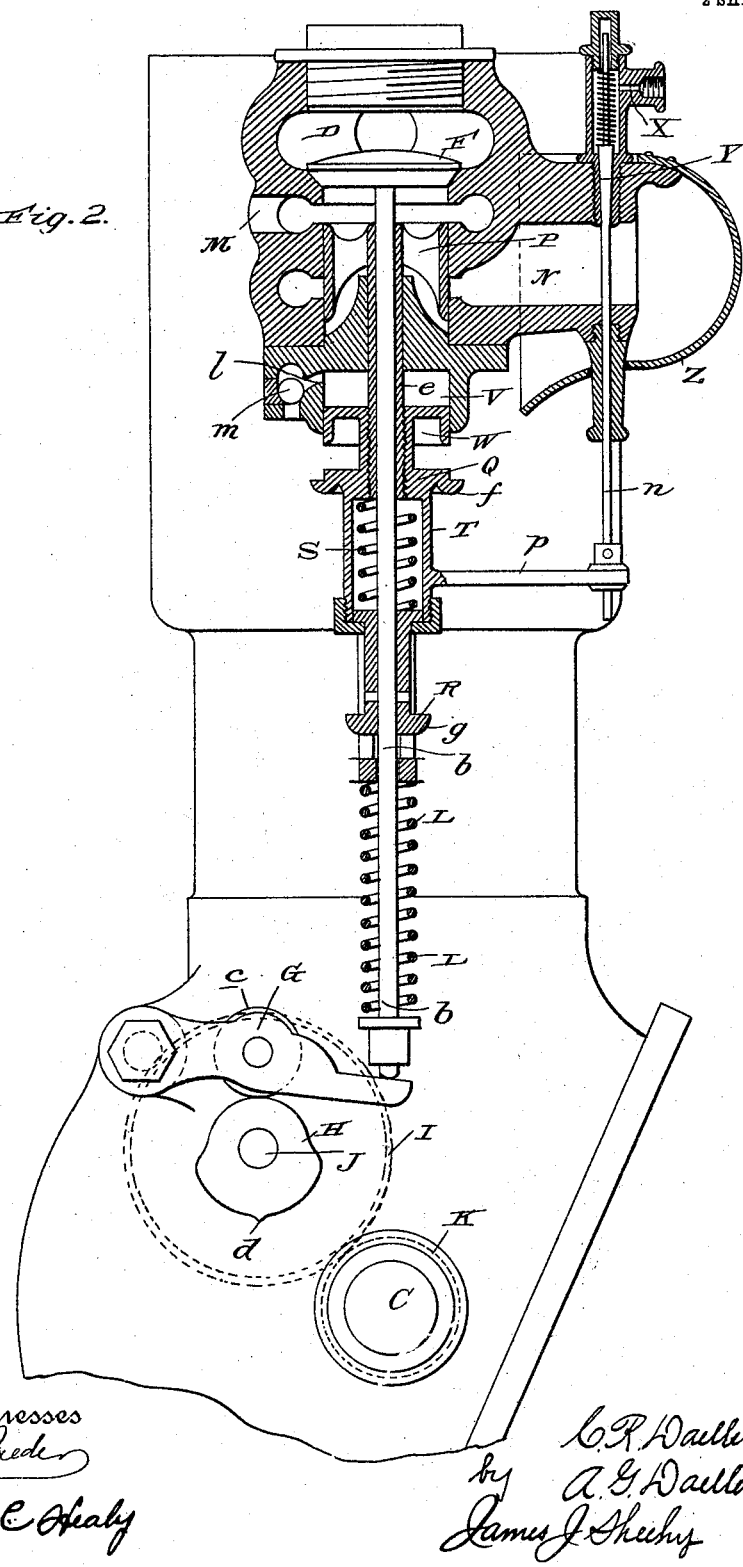

No. 783,105. Patented February 21, 1905.

UNITED STATES PATENT OFFICE.

CHARLES R. DAELLENBACH AND ARTHUR G. DAELLENBACH, OF PARK GATE, PENNSYLVANIA, ASSIGNORS TO DAELLENBACH GAS ENGINE COMPANY, OF PITTSBURG, PENNSYLVANIA.

VALVE-GEAR FOR EXPLOSIVE-ENGINES.

SPECIFICATION forming part of Letters Patent No. 783,105, dated February 21, 1905.

Application filed December 16, 1903. Serial No. 185,375.

*To all whom it may concern:*

Be it known that we, CHARLES R. DAELLENBACH and ARTHUR G. DAELLENBACH, citizens of the United States, residing at Park Gate, in the county of Beaver and State of Pennsylvania, have invented new and useful Improvements in Valve-Gear for Explosive-Engines, of which the following is a specification.

Our invention relates to improvements in explosive-engines; and it has for its general object to provide a simple and durable explosive-engine designed more especially for automobile and marine purposes and one which is reversible without the necessity of changing any of its parts, is adapted to be readily controlled, and is so constructed that there is no liability of its valve mechanism being overheated and in consequence impaired or disabled.

With the foregoing in mind the invention will be fully understood from the following description and claims when taken in conjunction with the accompanying drawings, in which—

Figure 1 is a longitudinal section of a four-cycle explosive-engine constituting one embodiment of our invention. Fig. 2 is a detail view taken at right angles to Fig. 1 and in the plane indicated by the broken line 2 2 of Fig. 1.

Similar letters of reference designate corresponding parts in both views of the drawings, referring to which—

A is the working cylinder of our improved engine; B, a working-piston movable therein; C, a crank-shaft connected with the piston in the ordinary or any other approved manner; D, a valve-chamber connected by a port or passage $a$ with the working cylinder; E, a valve-chamber; F, an exhaust-valve arranged in the chamber D to control communication between the same and the chamber E and having a stem $b$; G, Fig. 2, a lever arranged to engage the valve-stem $b$ and having, by preference, an antifriction-roller $c$; H, a cam arranged to engage the roller $b$ of lever G and having a teat or protuberance $d$ on its perimeter; I, a gear fixed on the shaft J, which carries the cam H, and intermeshed with a gear K, fixed on the crank-shaft C, and L a spring for closing the valve F and normally holding the same to its seat.

In virtue of the construction thus far described it will be observed that the cam H is driven from the crank-shaft C and that incident to each revolution of the cam the valve F and its stem $b$ are raised and lowered; also, that the completion of the upward movement of the valve and stem is effected suddenly, this latter because of the teat or protuberance $d$ on the perimeter of the cam and for a purpose presently pointed out.

The chamber E is provided with an exhaust-port M and an explosive-inlet port N and contains a piston-valve P, designed to control the said ports. This piston-valve is loose on the valve-stem $b$ and is connected by a sleeve $e$ with an abutment Q, disposed below the chamber E, between which abutment Q and an abutment R, fixed on the stem, a coiled spring S is interposed, as shown. The abutment Q is, by preference, the upper head of a cylinder T, which incloses the spring S and loosely receives the abutment R, and it preferably has its under side beveled at $f$ for a purpose presently described.

The abutment Q and the abutment R, which is preferably beveled at $g$, are designed to operate in conjunction with a spring-backed latch U, which has a beveled head $h$ to engage the abutment Q and a beveled arm $i$, arranged to be engaged by the abutment R.

V is a chamber disposed below the chamber E and having an air-exit port $j$, controlled by a valve $k$, and also having an air-inlet port $l$, controlled by an outwardly-seating non-return valve $m$; W, a piston arranged in the chamber V and formed integral with or otherwise fixed with respect to the abutment Q; X, a port or passage communicating with the port N and adapted to be connected with a source of gasolene-supply; Y, a valve arranged to control the port or passage X and having a stem $n$, connected to a lateral arm $p$ on the cylinder T, and Z a hood arranged over the outer end of the port N and preferably extending to a point adjacent to the casing containing the working cylinder A and the valve-chamber D.

The operation of our improved engine is as follows: Assuming that an explosion takes place while the working piston B is at the inner end of the working cylinder A and the valve F is closed, the working piston is forced outwardly, or toward the crank end of the engine. When the said piston reaches the center, the valve F is opened and the products of combustion pass out through the port $a$, chamber D, chamber E, and the port M. The valve F remains open until the piston again arrives at the inner end of the chamber A, and in consequence all of the products of combustion are forced out of the chamber. Incident to the piston reaching the inner end of the chamber A the teat or protuberance $d$ on the cam H engages the antifriction-roller $c$ on lever G, and in consequence the valve-stem $b$ and valve F are raised to a greater extent. This causes the abutment R to engage the arm $i$ of the latch U and effect a disengagement of the said latch from the abutment Q. Following the release of the abutment Q the spring S expands and moves the valve P toward the valve F, thereby closing the exhaust-port M and opening the explosive-inlet port N and also opening the valve Y, controlling the gasolene-supply port X. On the subsequent outward stroke of the working piston B a charge of explosive—$i. e.$, mixed air and gas or gasolene—is drawn into chamber A, and when the piston arrives at the center the valve F is closed, also the piston P moves downwardly, thereby closing the port N and the valve Y and opening the exhaust-port M. At the same time the abutment Q is engaged by the latch U, this to prevent the valve P from closing communication between the chamber E and the port M during the following exhaust. On the subsequent inward stroke of the piston B the charge of explosive mixture is compressed, and at the proper time such mixture is exploded by an igniter (not shown) located, by preference, in the chamber D. The operation described is then repeated.

The port $l$ and valve $m$ permit air to enter the chamber V back of the valve W, incident to the downward movement of the working piston, and in consequence the valve P is enabled to freely move downward and uncover the port M. On the upward movement of the valve W, however, the valve $m$ closes, so that the only escape for the air back of the piston is through the passage $j$. This passage $j$ being controlled by the valve $k$, it follows that by closing the said valve $k$ more or less the extent of which the port N and the port Y are opened, and in consequence the speed of the engine, may be readily regulated.

When desired, the valve $k$ may be operated through the medium of a hand or foot device; but since said device *per se* forms no part of our invention we have deemed it unnecessary to illustrate the same.

The products of combustion are discharged from the chamber A through port $a$, working cylinder D, chamber E, and port M, while the mixed air and gas are taken into said working cylinder A through the port N, chamber E, chamber F, and port $a$. From this it follows that incident to the taking of a charge the gasolene is caused to evaporate and rapidly commingle with the air, so as to form a reliable explosive mixture, and at the same time the air prevents overheating of the valve mechanism and materially lessens the liability of the same being deteriorated or disabled. The heating of the explosive mixture precedent to its entering the working cylinder A is a highly-important advantage, especially when the weather is cold, since it permits of a high speed being easily maintained.

We have entered into a detailed description of the construction and relative arrangement of the parts embraced in the present and preferred embodiment of our invention in order to impart a full, clear, and exact understanding of the same. We do not desire, however, to be understood as confining ourselves to such specific construction and arrangement of parts, as such changes or modifications may be made in practice as fairly fall within the scope of our invention as claimed.

Having described our invention, what we claim, and desire to secure by Letters Patent, is—

1. In an explosive-engine, the combination of a working cylinder, a working piston therein, a valve-chamber having an exhaust-port, and an explosive-inlet port, a valve operated from the working piston for controlling communication between the working cylinder and the valve-chamber, a piston or other suitable valve arranged in the valve-chamber to control the exhaust-port and the explosive-inlet port, means for holding the said valve in one position, means for releasing said valve, and means for moving it, independent of the first-mentioned valve, subsequent to its release.

2. In an explosive-engine, the combination of a working cylinder, a working piston therein, a valve-chamber having an exhaust-port, and an explosive-inlet port, a valve operated from the working piston for controlling communication between the working cylinder and the valve-chamber, a piston or other suitable valve arranged in the valve-chamber to control the exhaust-port and the explosive-inlet port, means for holding the said valve in one position, means for releasing said valve, means for moving the said valve, independent of the first-named valve subsequent to its release, a piston connected with the second-named valve, and a chamber containing said piston, and having an outlet for fluid, back of the same, and a valve controlling said outlet.

3. In an explosive-engine, the combination of a working cylinder, a working piston therein, a valve-chamber having an exhaust-port, and an explosive-inlet port, a valve operated from the working piston for controlling communication between the working cylinder and the valve-chamber, a piston or other suitable valve arranged in the valve-chamber to control the exhaust-port and the explosive-inlet port, means for holding the said valve in one position, means for releasing said valve, means for moving the second-named valve, independent of the first-named valve, subsequent to its release, a piston connected with the second-named valve, and a chamber containing said piston, and having an outlet for fluid, back of the same, and a valve controlling said outlet, and also having a fluid-inlet, and an outwardly-seating, non-return valve controlling the same.

4. In an explosive-engine, the combination of a working cylinder, a working piston therein, a valve-chamber having an exhaust-port, and an explosive-inlet port, a valve arranged to control communication between the working cylinder and the valve-chamber, and having a stem provided with an abutment, mechanism intermediate of the working piston and the stem of said valve for operating the latter, a piston-valve arranged in the valve-chamber to control the exhaust-port and explosive-inlet port, an abutment loosely mounted on the stem of the first-named valve, and connected with said piston-valve, a spring surrounding the valve-stem and interposed between the abutment thereof and the abutment loosely mounted thereon, and a latch arranged to engage the loose abutment on the valve-stem and be engaged by the fast abutment thereof.

5. In an explosive-engine, the combination of a working cylinder, a working piston therein, a valve-chamber having an exhaust-port, and an explosive-inlet port, a valve arranged to control communication between the explosion-chamber and the valve-chamber, and having a stem, provided with an abutment, mechanism intermediate of the working piston and the stem of said valve for operating the latter, a piston-valve arranged in the valve-chamber to control the exhaust-port and explosive-inlet port, an abutment loosely mounted on the stem of the first-named valve, and connected with said valve-piston, a spring surrounding the valve-stem and interposed between the abutment thereof and the abutment loosely mounted thereon, a piston connected with the piston-valve in the valve-chamber, a chamber receiving the said piston and having a fluid-outlet and a valve for controlling same, and also having a fluid-inlet and an outwardly-seating, non-return valve controlling the same, and a latch arranged to engage the loose abutment on the valve-stem and be engaged by the fast abutment thereof.

6. In an explosive-engine, the combination of a working cylinder, a working piston therein, a valve-chamber having an exhaust-port, and an explosive-inlet port, a valve arranged to control communication between the working cylinder and the valve-chamber and having a stem provided with a fast abutment, mechanism intermediate of the working piston and the stem of said valve for operating the latter; said mechanism comprising a cam having a teat or protuberance on its perimeter, a piston-valve arranged in the valve-chamber to control the exhaust-port and explosive-inlet port, an abutment loosely mounted on the stem of the first-named valve, and connected with said piston-valve, a gasolene-supply port communicating with the explosive-inlet port, a valve arranged to control the gasolene-port, and connected with the loose abutment, a spring surrounding the valve-stem and interposed between the abutment thereof and the loose abutment, and a latch arranged to engage the loose abutment on the valve-stem, and be engaged by the fast abutment thereof.

In testimony whereof we have hereunto set our hands in presence of two subscribing witnesses.

CHARLES R. DAELLENBACH.
ARTHUR G. DAELLENBACH.

Witnesses:
S. Y. DOUDS,
J. D. SWARTZ.